Figure 5:
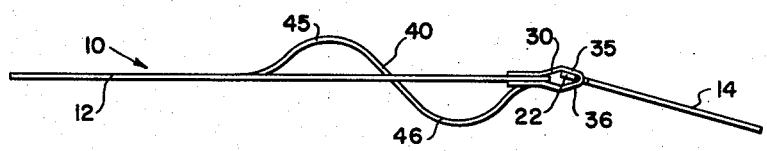

Oct. 20, 1964
C. G. LEMON
3,153,298
FISHING DEVICE
Filed July 2, 1962
2 Sheets-Sheet 1
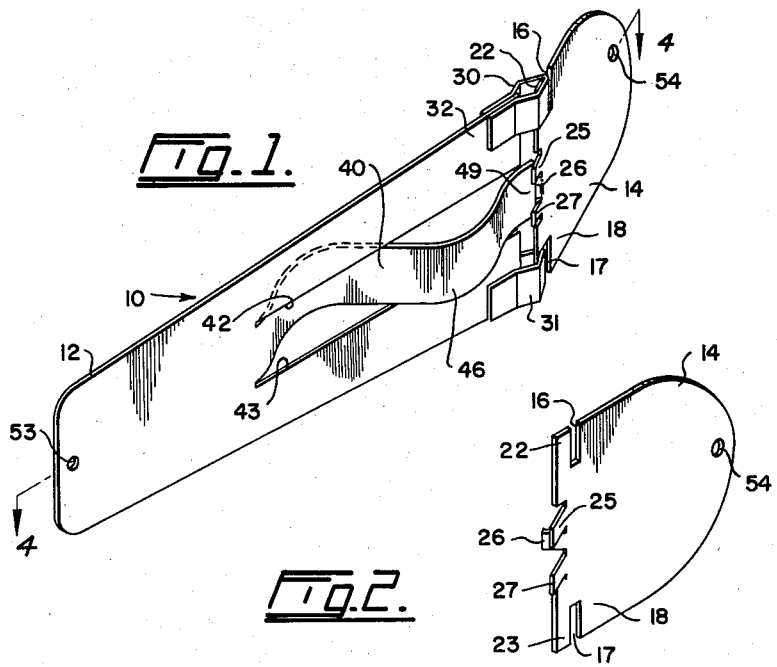
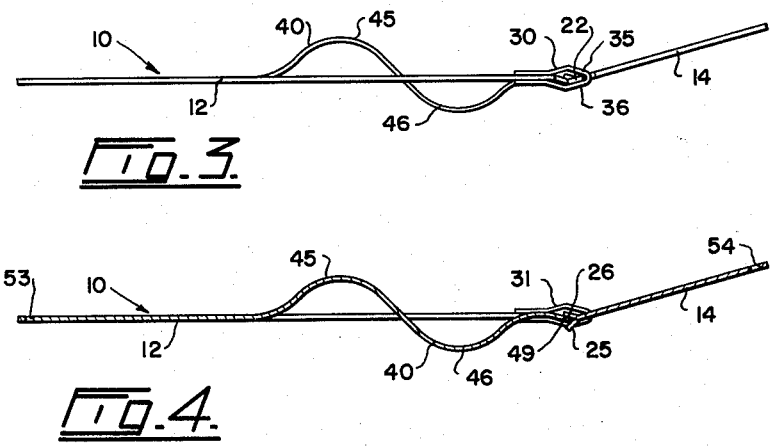
INVENTOR.
CECIL G. LEMON
BY
*Fetherstonhaugh & Co.*
ATTORNEYS

United States Patent Office 3,153,298
Patented Oct. 20, 1964

3,153,298
FISHING DEVICE
Cecil G. Lemon, 143 E. 15th St., North Vancouver, British Columbia, Canada
Filed July 2, 1962, Ser. No. 206,742
8 Claims. (Cl. 43—42.03)

This invention relates to a fishing device either in the form of a flasher or a fish lure.

A fish frequently travels in a zigzag course, and when chased by an enemy inevitably zigzags back and forth in an effort to escape. Many fishing lures have been devised that zigzag as they are drawn through the water. However, the lures of the prior art sweep back and forth across the line of travel in arcs of different magnitudes. Thus, the zigzagging is not very effective since it does not imitate the action of a fish. When a fish is scared or is being chased, it darts back and forth and up and down, it does not swing back and forth in even arcs. The fish actually travels in substantially a straight line and then abruptly turns onto a new course and again travels along a substantially straight line.

A fishing device according to the present invention follows a zigzag course as it is drawn through the water. However, it is designed to follow approximately a straight course and then abruptly to turn onto a new course for a predetermined time, after which it again abruptly turns back onto another course. Thus the device darts back and forth, up and down along a zigzag course in a manner very similar to a fish attempting evasive action. The action of this device is so realistic that fish have been caught many times as a result of the use of it where different prior art lures failed under exactly the same conditions and at the same time.

This fishing device is primarily designed to be used as a flasher ahead of a lure with hooks and bait. However, the device may be provided with hooks and/or bait if it is so desired.

The present fishing device is adapted to be towed through the water by a line having a weight thereon ahead of the device. Said device includes a tail section, and a head section hingedly connected to an end thereof and extending away therefrom substantially in line therewith. When in use, a weighted fishing line is connected to the outer end of the head section. Resilient means extending between the tail and head sections normally retains the head section inclined relative to the general plane of the tail section on either side of said plane. This resilient means is adapted to permit the head section to flop back and forth across the tail section plane when pulled across said plane by the fishing line. This causes the device to dart back and forth along a zigzag course. In the preferred form of the invention, the head and tail sections are flat so that they tend to plane through the water, and the device zigzags substantially vertically as it is drawn through the water.

Figure 6:
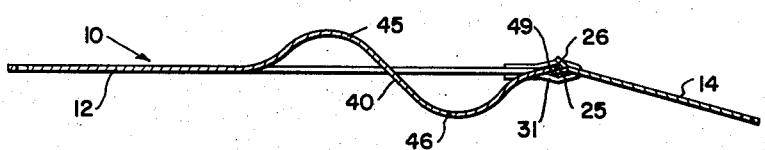
Figure 7:
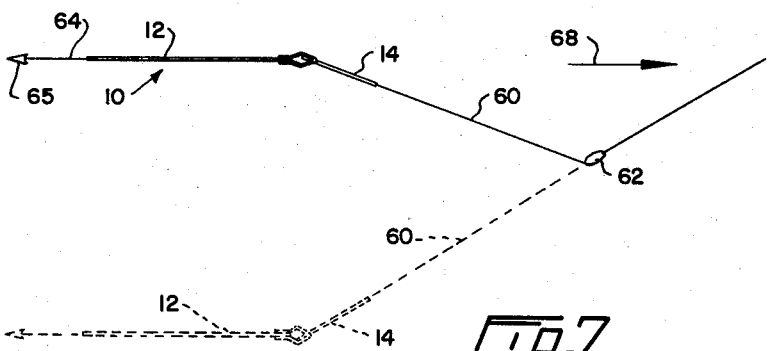

A preferred form of the invention is illustrated in the accompanying drawings, in which:

FIGURE 1 is a perspective view of the fishing device;
FIGURE 2 is a perspective view of the head section of the device separated from the tail section thereof;
FIGURE 3 is a side elevation of the device with the head section inclined upwardly;
FIGURE 4 is a horizontal section taken substantially on the line 4—4 of FIGURE 1;
FIGURE 5 is a side elevation of a device with the head section inclined downwardly;
FIGURE 6 is a view similar to FIGURE 4 with the head section inclined downwardly; and
FIGURE 7 is a diagrammatic view of the device being towed through the water and in its uppermost position just ready to dart downwardly.

Referring to the drawings, 10 is a fishing device made up of a comparatively long tail section 12 and a head section 14 hingedly connected thereto. As this device is designed to be used as a flasher, the tail and head sections are flat and made out of polished metal. Head section 14 is formed with slots 16 and 17 extending inwardly from opposite edges thereof near the inner end 18 of said section. These slots form a pair of spaced pintles 22 and 23 extending laterally away from each other at the inner end 18 of the head section. A pair of lugs 25 and 26 extend outwardly from the head section end 18 centrally of said end and are inclined outwardly on opposite sides of the section, as clearly shown in FIGURE 2. If desired, another lug 27 may extend outwardly from the section end on the same side as lug 25.

Tail section 12 is provided with a pair of loops 30 and 31 at its inner end 32, said loops being so positioned as to embrace the head section pintles 22 and 23 to form therewith a hinge connection between sections 12 and 14. It is preferable to form loop 30 with substantially flat surfaces 35 and 36 angled relative to each other to limit the movement of the head section and extending outwardly on opposite sides of the general plane of tail section 12, said surfaces also extending rearwardly towards said tail section. Loop 31 is formed with angular surfaces corresponding to surfaces 35 and 36 of loop 30, although they do not appear in the drawings.

Resilient means is provided between sections 12 and 14 to retain head section 14 inclined relative to the general planes of tail section 12 on either side of said plane. In this example, the resilient means is in the form of a spring arm 40 on the tail section extending towards the inner end 18 of head section 14. This spring arm is conveniently formed of the material of section 12, said section having parallel slots 42 and 43 cut therein and extending out through the section end 32. The metal between these slots constitutes spring arm 40, and this is bent back and forth at 45 and 46 across the plane of section 12. Spring arm 40 before being bent at 45 and 46 is longer than section 12 so that after the arm is bent a straight outer end 49 of the arm is substantially within the plane of section 12 and extends between lugs 25, 27 and 26 of head section 14. The springiness of arm 40 presses the outer end 49 thereof either against lug 26, as shown in FIGURE 6, or against lugs 25, 27 as shown in FIGURE 4. When arm 40 bears against lug 26, head section 14 is inclined downwardly or to one side of the plane of tail section 12, at which time lugs 25, 27 bear against the side of arm end 49 to limit the outward inclination of said head section. Similarly, when arm 40 bears against lugs 25, 27, head section 14 is inclined upwardly relative to the general plane of tail section 12, at which time lug 26 bears against the opposite surface of arm end 40 to limit this outward inclination.

By referring to FIGURE 3, it will be seen that when arm 40 bears against lugs 25, 27, pintle 22 of the head section bears against surface 36 of loop 30, thus helping to limit the outward movement of said head section. FIGURE 5 shows that when arm 40 bears against lug 26, pintle 22 bears against loop surface 35 to help limit the outward movement of the head section in the opposite direction. With this arrangement, head section 14 is always retained in a position inclined relative to the general plane of tail section 12 on either side of said plane. When the head section is moved from its inclined position towards the plane of the tail section it suddenly flops or snaps over to the other side of said plane. In other words, the movement of section 14 back and forth across the plane of the tail section is not just a swinging movement, but it is a flop or snap action. It therefore has two stable positions at approximately 40° apart.

As it is necessary to connect parts of a fishing line to opposite ends of device 10, sections 12 and 14 thereof are formed with holes 53 and 54 near their outer ends.

FIGURE 7 diagrammatically illustrates device 10 in operation. A fishing line 60 is tied to head section 14 through hole 54 thereof. This line has a weight 62 thereon ahead of the fishing device. Another line or leader 64 is connected to tail section 12 through hole 53 thereof, said line or leader having a suitable lure or bait 65 secured to its outer end. Line 60 extends from a boat, not shown, on the water travelling in the direction of arrow 68, and device 10 is shown in full lines in its uppermost position, head section 14 having just snapped downwardly. As the line and its weight 62 move in the direction of arrow 68, the downward inclination of section 14 causes the device to move downwardly until it reaches the position shown in dotted lines. As the device is light as compared to weight 62, the drag of the latter pulls head section 14 upwardly, causing it to snap across the plane of tail section 12, and this results in the device darting upwardly. As it reaches the position shown in full lines in FIGURE 7, weight 62 causes head section to start to swing downwardly so that it snaps across the tail section plane thereby causing the device to dart downwardly again. As the head section always flops across the plane of the tail section, the device always snaps from one course to the next course extending at an angle to said first-mentioned course. Thus device 10 simulates the darting zigzag action of a fish when it is being chased. By adjusting the distance between weight 62 and device 10 and/or varying the amount of weight, the extent of lateral travel of the fishing device can be regulated and controlled.

It is obvious that device 10 can be made in different sizes and shapes, and it may have hooks and/or bait attached thereto so that it acts as a lure. The main thing is to have a head section which flops back and forth in the manner described above in order to cause the device to dart back and forth along a zigzag course.

What I claim as my invention is:

1. A fishing device to be towed through the water by a line having a weight thereon ahead of the device, comprising a long tail section, a short head section hingedly connected at an inner end thereof to an end of the tail section and extending away therefrom, said head section having a forward end which during use is connected to a weighted fishing line, a pair of lugs on the inner end of the head section extending towards the tail section and inclined outwardly on opposite sides thereof, and a spring arm on the tail section extending towards the inner end of the head section between said lugs thereof and having a free end resiliently bearing against either lug to press the latter outwardly from one side of the device and consequently incline the head section outwardly and forwardly from the opposite side of the device, said resilient arm permitting the head section to flop back and forth across the tail section plane when pulled across said plane by the fishing line, thereby causing the device to dart back and forth along a zigzag course.

2. A fishing device as claimed in claim 1 including stop means on one section positioned to engage the other section to limit the angle of inclination of the head section relative to the tail section on either side of the latter.

3. A fishing device to be towed through the water by a line having a weight thereon ahead of the device, comprising a long flat tail section, a short flat head section hingedly connected at an inner end to an end of the tail section and extending away therefrom, said head section having a forward end which during use is connected to a weighted fishing line, a pair of lugs on the inner end of the head section extending towards the tail section and inclined outwardly on opposite sides thereof, and a spring arm on the tail section extending towards the inner end of the head section between said lugs thereof and having a free end resiliently bearing against either lug to press the latter outwardly from one side of the device and consequently incline the head section outwardly and forwardly from the opposite side of the device, said resilient arm permitting the head section to flop back and forth across the tail section plane when pulled across said plane by the fishing line, thereby causing the device to dart back and forth along a zigzag course.

4. A fishing device to be towed through the water by a line having a weight thereon ahead of the device, comprising a flat tail section, a flat head section having an inner end adjacent an inner end of the tail section, said head section extending away from the tail section, a pair of spaced pintles on the head section at the inner end thereof and extending laterally away from each other, loops on the inner end of the tail section embracing said head section pintles to form therewith a hinge connection between the sections, said head section having a forward end which during use is connected to a weighted fish line, a pair of lugs on the inner end of the head section extending towards the tail section and inclined outwardly on opposite sides thereof, and a spring arm on the tail section extending towards the inner end of the head section between said lugs thereof and resiliently bearing against either lug to press the latter outwardly from one side of the device and consequently incline the head section outwardly and forwardly from the opposite side of the device, said resilient arm permitting the head section to flop back and forth across the tail section plane when pulled across said plane by the fishing line, thereby causing the device to dart back and forth along a zigzag course.

5. A fishing device as claimed in claim 4 in which the pintles are flat, and the loops are formed with stop surfaces against which the pintles abut to limit the outward movement of the head section on either side of the tail section plane.

6. A fishing device as claimed in claim 4 in which the spring arm is bent back and forth across the plane of the tail section.

7. A fishing device to be towed through the water by a line having a weight thereon ahead of the device, comprising a long flat tail section, a short flat head section hingedly connected at an inner end to an end of the tail section and extending away therefrom, said head section having a forward end which during use is connected to a weighted fishing line, a pair of lugs on the inner end of the head section extending towards the tail section and inclined outwardly on opposite sides thereof, said tail section having a pair of parallel slots therein extending inwardly of the tail section from said end thereof forming a spring arm between the slots extending towards the inner end of the head section between the lugs thereof and having a free end resiliently bearing against either lug to press the latter outwardly from one side of the device and consequently incline the head section outwardly and forwardly from the opposite side of the device, said resilient arm permitting the head section to flop back and forth across the tail section plane when pulled across said plane by the fishing line, thereby causing the device to dart back and forth along a zigzag course.

8. A fishing device as claimed in claim 7 in which the spring arm is bent back and forth across the plane of the tail section and the free end of said arm terminates at said end of the tail section.

References Cited in the file of this patent

UNITED STATES PATENTS

| | | |
|---|---|---|
| 2,150,846 | Rayburn | Sept. 19, 1939 |
| 2,556,533 | Graaten | June 12, 1951 |
| 2,789,386 | Creelman | Apr. 23, 1957 |